United States Patent
Cao et al.

(10) Patent No.: US 9,251,212 B2
(45) Date of Patent: Feb. 2, 2016

(54) PROFILING IN A MASSIVE PARALLEL PROCESSING ENVIRONMENT

(75) Inventors: Wu Cao, Redwood City, CA (US); Sridhar Ganti, Alameda, CA (US); Balaji Gadhiraju, Cupertino, CA (US)

(73) Assignee: Business Objects Software Ltd., Dublin (IE)

( * ) Notice: Subject to any disclaimer, the term of this patent is extended or adjusted under 35 U.S.C. 154(b) by 1217 days.

(21) Appl. No.: 12/413,289

(22) Filed: Mar. 27, 2009

(65) Prior Publication Data

US 2010/0250563 A1     Sep. 30, 2010

(51) Int. Cl.
*G06F 17/30* (2006.01)

(52) U.S. Cl.
CPC .... *G06F 17/30469* (2013.01); *G06F 17/30445* (2013.01)

(58) Field of Classification Search
CPC .................................................. G06F 17/30445
USPC .............................................. 707/4, 970, 974
See application file for complete search history.

(56) References Cited

U.S. PATENT DOCUMENTS

| | | | |
|---|---|---|---|
| 5,970,495 A * | 10/1999 | Baru et al. | |
| 6,169,983 B1 * | 1/2001 | Chaudhuri et al. | |
| 7,275,053 B1 * | 9/2007 | Gardner et al. | |
| 2003/0028509 A1 * | 2/2003 | Sah et al. | 707/1 |
| 2003/0154197 A1 * | 8/2003 | Millet et al. | 707/9 |
| 2004/0098372 A1 * | 5/2004 | Bayliss et al. | 707/3 |
| 2005/0187977 A1 * | 8/2005 | Frost | 707/104.1 |
| 2006/0271504 A1 * | 11/2006 | Anderson et al. | 707/2 |
| 2007/0021992 A1 * | 1/2007 | Konakalla | 705/7 |
| 2007/0073721 A1 * | 3/2007 | Belyy et al. | 707/10 |
| 2007/0074176 A1 * | 3/2007 | Cao et al. | 717/130 |
| 2009/0254516 A1 * | 10/2009 | Meiyyappan et al. | 707/2 |
| 2010/0011031 A1 * | 1/2010 | Huang et al. | 707/202 |

\* cited by examiner

*Primary Examiner* — James Trujillo
*Assistant Examiner* — Grace Park
(74) *Attorney, Agent, or Firm* — Fountainhead Law Group PC (57) ABSTRACT

A computer-implemented method of profiling a data set in a parallel processing environment includes vertically partitioning an initial data set. One or more attribute subsets are then profiled. A list of subjects is generated each corresponding to a specific attribute value identified in the profiling. Values of multiple attributes are extracted for each identified subject, and the sample results are assembled and merged.

22 Claims, 6 Drawing Sheets

View Data - CUSTOMERS [Forenxa.DBO]

Update    Records: 91

| Column | Nulls | Nulls % | Zeros | Blanks | Blanks % | Patterns |
|---|---|---|---|---|---|---|
| CONTACT NAME | | | | | | |
| CONTACT TITLE | | | | | | |
| ADDRESS | | | | | | |
| CITY | | | | | | |
| REGION | | | | | | |
| POSTALCODE | | | | | | |
| COUNTRY | | | | | | |
| PHONE | | | | | | |
| FAX | | | | | | |

Profiling data ((999) 999-9999)

Profiling data (PHONE, Patterns)

| Value | Records | % of total |
|---|---|---|
| (999) 999-9999 | | |
| (9) 999-9999 | | |
| (99) 999-9999 | | |
| 99.99.99.99 | | |
| 9999-999999 | | |
| (99) 999 99 99 | | |
| (999) 9999999 | | |
| (9) 99.99.99.99 | | |
| 9999-99999 | | |

| CUSTOMERID | COMPANYNAME | CONTACTNAME | CONTACTTITLE | ADDRESS | CITY | REGION |
|---|---|---|---|---|---|---|
| AROUT | | | | | | |
| BOTTM | | | | | | |
| BSBEV | | | | | | |
| CONSH | | | | | | |
| EASTC | | | | | | |
| GREAL | | | | | | |
| HUNGC | | | | | | |
| ISLAT | | | | | | |
| LAUGB | | | | | | |
| LAZYK | | | | | | |
| LETSS | | | | | | |

Last updated: 10/23/08 3:18:00 PM

| Row ID | Column ID | Column Value |
|---|---|---|
| 4 | CustomerID | AROUT |
| 4 | CompanyName | Around the Horn |
| 4 | ContactName | Thomas Hardy |
| 4 | ContactTitle | Sales Representative |
| 4 | Address | 120 Hanover Sq. |
| 4 | City | London |
| 4 | Region | Europe |
| 4 | PostalCode | WA1 1DP |
| 4 | Country | UK |
| 4 | Phone | (171) 555-7788 |
| 4 | Fax | (171) 555-6750 |

FIG. 7

| CustomerID | CompanyName | ContactName | ContactTitle | Address | City | Region | PostalCode | Country | Phone | Fax |
|---|---|---|---|---|---|---|---|---|---|---|
| AROUT | Around the Horn | Thomas Hardy | Sales Representative | 120 Hanover Sq. | London | Europe | WA1 1DP | UK | (171) 555-7788 | (171) 555-6750 |

FIG. 8

PROFILING IN A MASSIVE PARALLEL PROCESSING ENVIRONMENT

BACKGROUND

The present invention relates to computer software, and in particular, to profiling in a parallel processing environment such as a massive parallel processing (MPP) environment.

Large sets of data may initially be organized into rows each associated with a certain subject such as a customer, employee, vendor, contributor, investor, tax payer, item of real or personal property, etc., and columns each associated with a certain attribute of the subjects. When a company wishes to know specifically what the salary and start date of a certain employee is, then the particular employee identification number, or employeeID, can be entered and these and other information will be available in the row associated with that employeeID. The data itself may be stored in files of, for example, ten employees each, so that a first file includes information relating to employees 1-10, a second file includes information relating to employees 11-20, and a third file includes information relating to employees 21-30, etc. If the specific employeeID is 22, then the third file will be retrieved containing the relevant information about the employee having employeeID 22. As it is often the case that the company will wish to find specific information in this way, then the organization of the data according to subjects in rows and attributes in columns is efficient.

However, efficiencies of specific searching through data files organized with subjects as rows and attributes as columns breaks down when it is desired to profile data. In a profiling process, it is typically desired to search the data in a particular column to check whether it matches one or more input criteria. For example, the subjects may be employees, and the criteria may be employees making over a certain salary or it may be desired to find the minimum, maximum or average salary of a group of employees, or it may be desired to determine which employees were hired after a certain date, among many other potential queries. Now, if the data is organized into the first, second and third files as the first ten, second ten and third ten employeeIDs, then all of the files would be retrieved including all of the data about every employee just to retrieve all of the data in one column.

Thus, there is a need for a more effective and efficient way to profile data. The present invention solves this problem by providing an efficient and effective method of profiling in a MPP environment.

SUMMARY

Embodiments of the present invention include a computer-implemented method of profiling a data set in a parallel processing environment. An initial data set is partitioned vertically or otherwise according to multiple attribute subsets. One or more of the attribute subsets is profiled. A list of subjects or otherwise horizontal component values is generated each corresponding to a specific attribute value identified in the profiling. Values of multiple attributes are extracted for each identified subject or otherwise horizontal component value. Sample results are assembled of the identified subjects or otherwise horizontal component values. The sample results are merged to form a profiled subset of the initial data set. The profiled subset and/or a further processed version is/are transmitted, displayed and/or stored.

The initial data set may include a table having m rows and n columns. Each column may correspond to a specific attribute and each row may correspond to a specific subject or otherwise horizontal component value.

A different set of one or more machines may be assigned to each of the multiple attribute data sets. The profiling may include concurrently profiling the multiple data sets assigned to the different sets of one or more machines.

The merging may involve removing duplicate subject sets of sample results and/or sorting the sample results.

A computer network including a parallel processing environment is also provided. The network includes a data source, multiple projection computers, and one or more client computers connected to the multiple projection computers and having computer-readable code embedded therein for programming the one or more client computers to perform any of the methods described herein of profiling a data set in a parallel processing environment.

One or more processor-readable media are also provided having embedded therein processor-readable code to program one or more processors to perform any of the methods described herein of profiling a data set in a parallel processing environment.

The following detailed description and accompanying drawings provide a better understanding of the nature and advantages of the present invention.

DETAILED DESCRIPTION

Described herein are processes for profiling in a parallel processing environment. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Profiling is a resource consuming operation. This idea is to leverage CPU bandwidth and memory available in a parallel processing environment and improve the performance of a profiling process.

Data profiling is to use analytical techniques to discover the true structure, content and quality of a collection of data. It reads the data and generates attributes about the data, including min/max/average value, cardinality, data frequency distribution, patterns, etc. Usually it also saves samples for each attribute.

Data profiling is a resource (both CPU and memory) consuming operation. If there are many machines available, it is desirable to distribute the operations on different machines.

Most of the existing parallel profiling approaches read data out of a source column-by-column. If the source is being updated dynamically, those approaches are not able to provide users with consistent results for each attribute.

In taking out columns from sources and staging them separately for profiling, certain embodiments of the invention provide dynamic and consistent source updating for each attribute. Attributes of different columns may be processed at different times. If the data is being changed, the same data set is provided for all columns. A staging file may be created to ensure the same data are being used for calculating attributes for different columns even at different times. Different columns may be extracted at the same time and saved into static files. In this way, the different columns have their rows consistent with the other columns throughout. The risk of a row being updated partway through, i.e., having an old value in one column and a new value in another column that is extracted later is in this way prevented.

VERTICAL PARTITIONING

Several embodiments are described herein below for profiling large sets of data that are initially organized into rows each associated with a certain subject such as a customer, employee, vendor, contributor, investor, tax payer, item of real or personal property, etc., and columns each associated with a certain attribute of the subjects. For example, a company may wish to profile a subset of employees or all of its employees to determine which meet one or more input criteria. For example, the subjects may be employees, and the criteria may be employees making over a certain salary or it may be desired to find the minimum, maximum or average salary of a group of employees, or it may be desired to determine which employees were hired after a certain date, among many other potential queries. Other examples may include a data set of credit scores or other financial attributes of customers or persons to whom a lending institution might loan money. Another example would be a telecommunications data set of peak time demographics, having columns such as the person called, the person calling, and the geographic locations of the persons called and calling during the peak time.

Several embodiments are provided herein below describing more effective and efficient ways to profile data. In accordance with these embodiments, the data are vertically partitioned rather than horizontally partitioned as in the example provided in the Background above. In this way, only the file or files containing certain attribute information are retrieved in a profiling query resulting in greatly enhanced efficiency over a process that retrieves all of the data to search through only a fraction of it.

As an example, a vendor roster may include 400 terabytes of data organized with each row corresponding to a particular vendor and each column corresponding to a particular attribute of that vendor including number of products purchased, total amount paid for the products, and average ship time. In this example, for profiling purposes, the data may be organized into four files of 100 terabytes each, or four subsets of files, wherein the first file will include all of the vendorIDs, the second file will include all of the numbers of products purchased from all of the vendors in the first file, the third file will include all of the amounts paid for the products of all of the vendors in the first file, and the fourth file will include all of the average ship times of all of the vendors in the first file. Now in certain embodiments, the data may be linked back to the vendor name file, and the company may search the second file to find out which vendors have shipped more than 100 products, and may search the third file to find out which vendors have been paid more than $100,000, and may search the fourth file to find out which vendors have ship time under three days. Each of the profile searches in this example can be performed by retrieving and searching just one of the four files, or four subsets of files, or 100 terabytes of data, without retrieving the others of the four files. Thus, 300 terabytes of unnecessary data are not retrieved in this advantageous example compared with the problems associated with profiling horizontally partitioned data.

Figure 1:
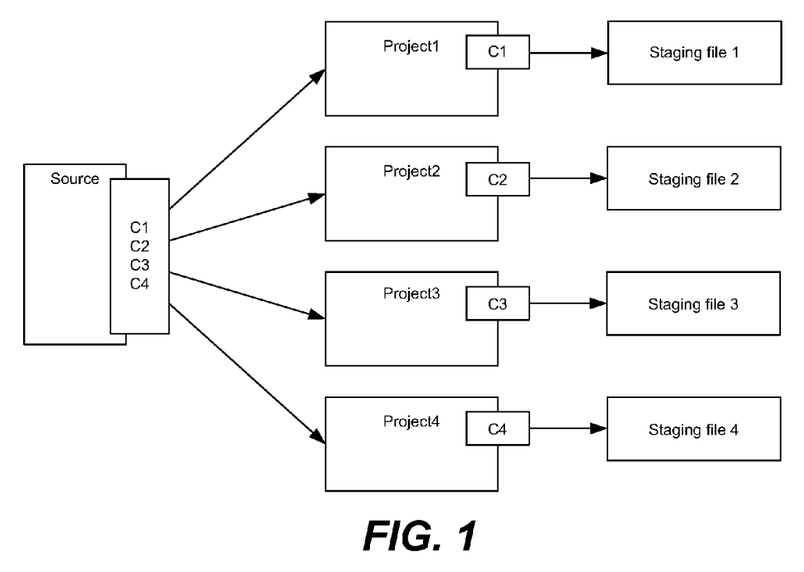
FIG. 1 illustrates vertical partitioning of data in accordance with certain embodiments.

FIG. 1 illustrates vertical partitioning of data in accordance with certain embodiments. A Source of data is shown in FIG. 1 as being organized into four columns C1, C2, C3, C4, which as mentioned would ordinarily include a first column of subjects and three columns of attributes pertaining to those subjects. The data is then indicated in FIG. 1 as being vertically partitioned into four groups including column C1 into Projection1, column C2 into Projection2, column C3 into Projection3, and column C4 into Projection4. These four subsets are indicated in FIG. 1 as being stored into staging files 1-4. Now, the profiling of the attributes of all of the subjects may be performed by retrieving just the particular staging file that includes all of the data pertaining to the attribute being profiled.

To ensure the consistency of source data during profiling, a materialized view of the current data set is hereby created. The data may be copied to the staging files. Physical flat files are used as the materialized area, which can be accessed by one or more machines across a network. These staging files may have an internal binary format to minimize file processing. The vertical partitioning of the source data reduces network and staging file processing costs. Major advantages of having the source data vertically partitioned include reduced network communication costs and reduced staging file processing costs. The reduction of network communication costs is realized when, after partitioning, only ¼ of the data is copied to a machine to do the profiling of a single attribute in the example of FIG. 1. The reduction of staging file processing costs is realized when reading a column out of a staging file for profiling. These staging files may be used when saving samples of profiling attributes.

Even if all of the data is not retrieved from a horizontally partitioned data set, the process would still involve skipping columns in front of columns to be profiled, which is itself time consuming. With vertical partitioning, the time that would otherwise be lost skipping these columns before the column to be profiled or retrieving unnecessary data is advantageously saved, thus cutting down overall processing time. Vertical partitioning cuts down on skipping through many preceding columns. In an alternative embodiment, a staging file could contain more than one column of data. For example, if there are 12 columns and only 4 machines, 4 staging files of 3 columns each may be created. This still cuts down on column skipping, although it does not eliminate it.

PROFILING CONCURRENTLY ON MULTIPLE MACHINES

Figure 2:
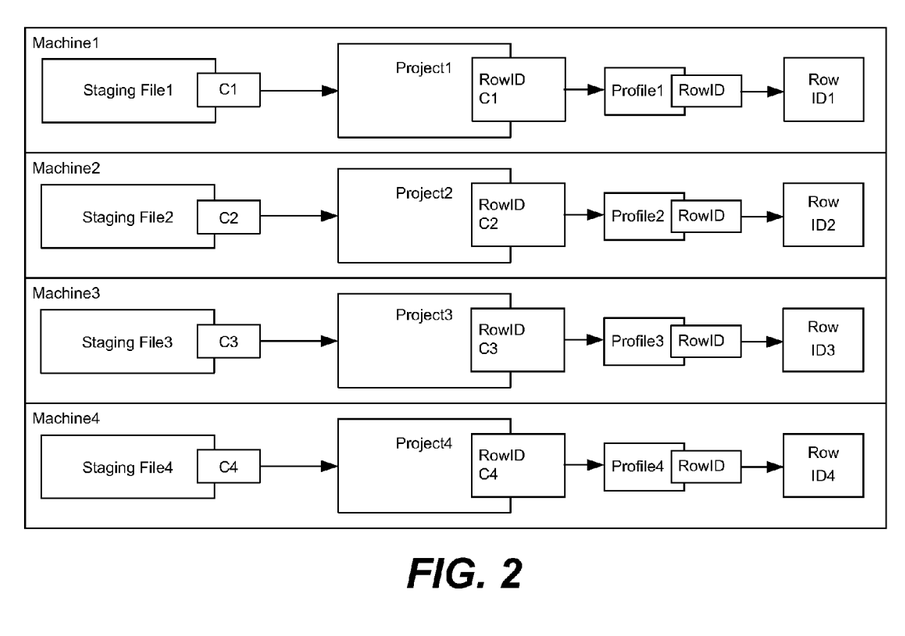
FIG. 2 illustrates performing profiling concurrently on multiple machines in accordance with certain embodiments.

FIG. 2 illustrates performing profiling concurrently on multiple machines in accordance with certain embodiments. In the example of FIG. 2, four staging files 1-4 have been stored on machines 1-4. These staging files 1-4 include columns C1-C4, respectively. Columns C1-C4 may be four different columns within a single data set, or may be unrelated profiling operations on columns in different data sets, or may include one or more redundancies. Although not required, any attributes are generally calculated for a column on a single machine. Also, multiple criteria can be profiled for the same data on the same machine.

The staging files 1-4 of FIG. 2 are copied as projections 1-4 onto four different machines for performing the profiling process. The projection may be used to define what the data is being profiled for, e.g., max, min, avg, etc. The projection is generally a transform to reduce the number of output columns from input columns or to add new columns to the output columns. Such may be compared to column selection in SQL statements.

The staging files are then available for copying for other profiling processes. Results are stored as Profiles 1-4 associated with the RowID of the specific attribute values gathered from the data, if applicable. For example, if any of the minimum or maximum salary or earliest hire date is being profiled, then the RowID identifying a specific subject employee where the value can be found in the original data set is provided with the Profile file. However, if the average salary is being profiled, then no specific RowID will be associated with that Profile file.

After profiling is done, attributes about a column are saved into a repository together with the row IDs (a sequence number) of the data sample for each attribute. Row IDs for the data sample rows are then saved into a file. For example, if the data relates to tires for automobiles, one attribute for of each tire model may be the ratings that are provided by the tire companies in terms of the number of miles that the tire models are expected to last before replacement is recommended. These tire models may be profiled to find those tires in the dataset which have ratings of 80,000 miles and greater. Of course, this would not be the typical purpose for data profiling. More often, profiling is meant to identify general stats about the data (e.g., min, max, avg, cardinality, patterns, data distribution, etc.), rather than finding answers to specific queries even though such is possible in certain embodiments of the invention. The profiling may find three tire models that satisfy this rating criterion, e.g., Goodyear product serial number 5mtgb41, Continental product serial number 62645.5, and Firestone product serial number FS-288901LR. These three tire models will have rowIDs associated with them from the dataset which will be stored into a file in certain embodiments. For example, the identified Goodyear tire may be found at rowID 595 in the dataset, the Continental product may be found at rowID 650, and the Firestone product may be found at rowID 725.

Then, continuing with this example, all or some of the attributes, or perhaps just the rating, for each of the three identified tire products may be collected from the various previously vertically-partitioned files and stored together with their associated rowIDs. These attributes correspond to those originally found in the dataset at rowIDs 595, 650 and 725 which correspond to the three identified tire products. A display set may be generated including three rows and/or three columns corresponding to each of the three tire models identified in the profiling process described above in this example.

CREATE A UNION OF ALL IDS OF ROWS TO BE SAVED AND SORT THEM

Figure 3:
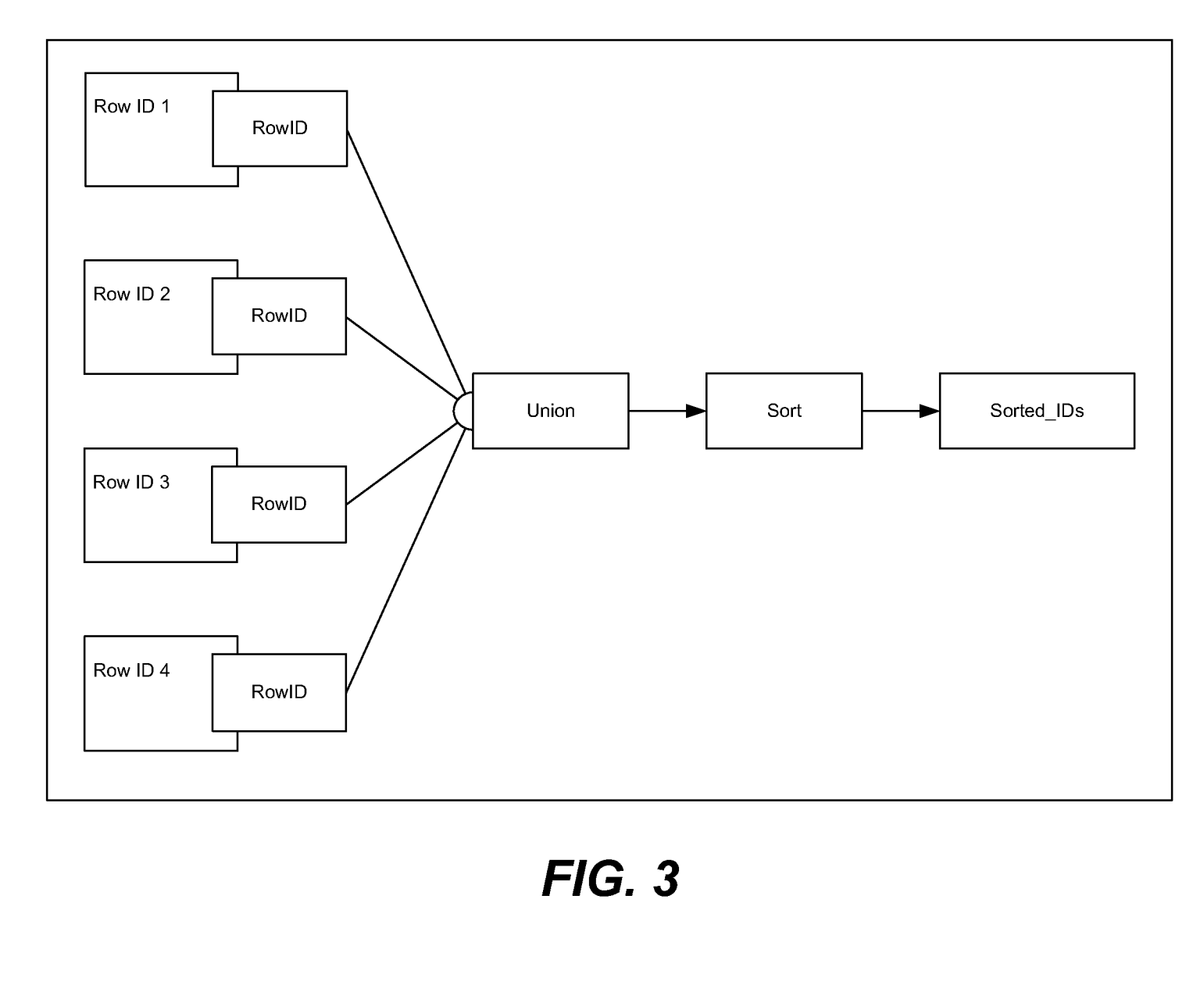
FIG. 3 illustrates creating a union of IDs of rows to be saved and sorted.

FIG. 3 illustrates creating a union of IDs of rows to be saved and sorted. That is, after the profiling is done, the determined Row ID files for the columns may be combined in the example illustrated at FIG. 3. For example, if one is profiling a vendor data set and finds that the minimum price paid value is found in RowID 4, while the earliest ship date is found at RowID 2 then a sort operation assembles a subset table of the original data set table including the entire Row 4 or selected columns of Row 4 along with the entire Row 2 or selected columns of Row 2, perhaps as the first and second rows of the subset table. Advantageously, the rowIDs are compiled and sorted, and duplicates are removed. Data from the data profiling is compiled here into a list. Later, data may be extracted from staging files to create complete or partial rows. The subset table may have a first column of RowIDs having attribute values meeting criteria of the profiling, a second column of ColumnID's having the attributes that were profiled, and a third column including the values found at those particular RowID-ColumnID intersections.

As a result, a list of rows for an attribute sample may be created. Any duplicates may be removed. Then, a final list may be sorted in a selected order, e.g., by ascending RowID order.

While this process is described with reference to FIGS. 5-7 below, a simplified example includes a profiling process that identifies three marketing managers: Howard Snyder, Helen Bennett and John Steel. These are respectively associated with customerIDs (rowIDs) GREAL, ISLAT, and LAZYK. The attributes corresponding to each of these customerIDs are gathered, e.g., for Howard Snyder who has customerID GREAL, other attributes include company name Great Lakes Food Market, and Address and other contact information. Those other attributes are reunited with their customerIDs, and upon forming a union of these, a final table including three rows each associated with one of the identified marketing managers may be generated and displayed.

MERGE-SORT-JOIN WITH STAGING FILES TO SAVE ATTRIBUTE SAMPLES

Figure 4:
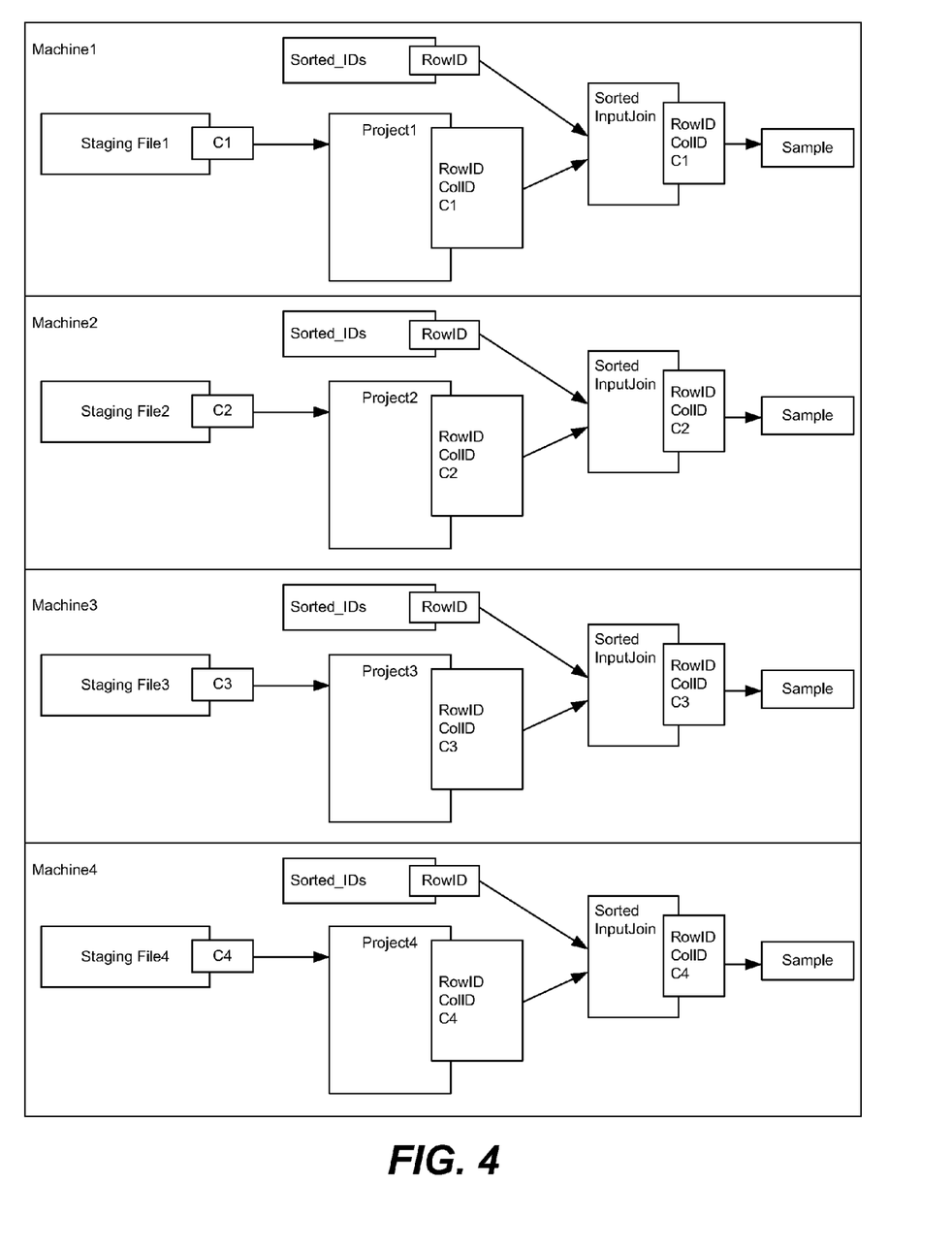
FIG. 4 illustrates merging, sorting and joining staging files in accordance with certain embodiments.

FIG. 4 illustrates merging, sorting and joining staging files in accordance with certain embodiments. After IDs are combined or a union command or operation is applied to them, duplicates are removed and IDs are sorted, they are joined with staging files to extract the values for each column of the pertinent rows. As illustrated at FIG. 4, the Sorted_IDs including RowIDs are joined with Projections 1-4 data including RowID, ColumnID and the particular column data of the Staging files 1-4 associated with them. The sample results are saved into a table with the following pivoted schema:

Column ID (name)
Row ID (Row number)
Column value

A customer may then reverse pivot this table to produce the full sample rows, if desired. In a union/merge operation, RowIDs are combined to create a super-set including multiple IDs. Then, duplicates are removed. RowIDs are sorted at the end.

EXAMPLE

Figure 5:
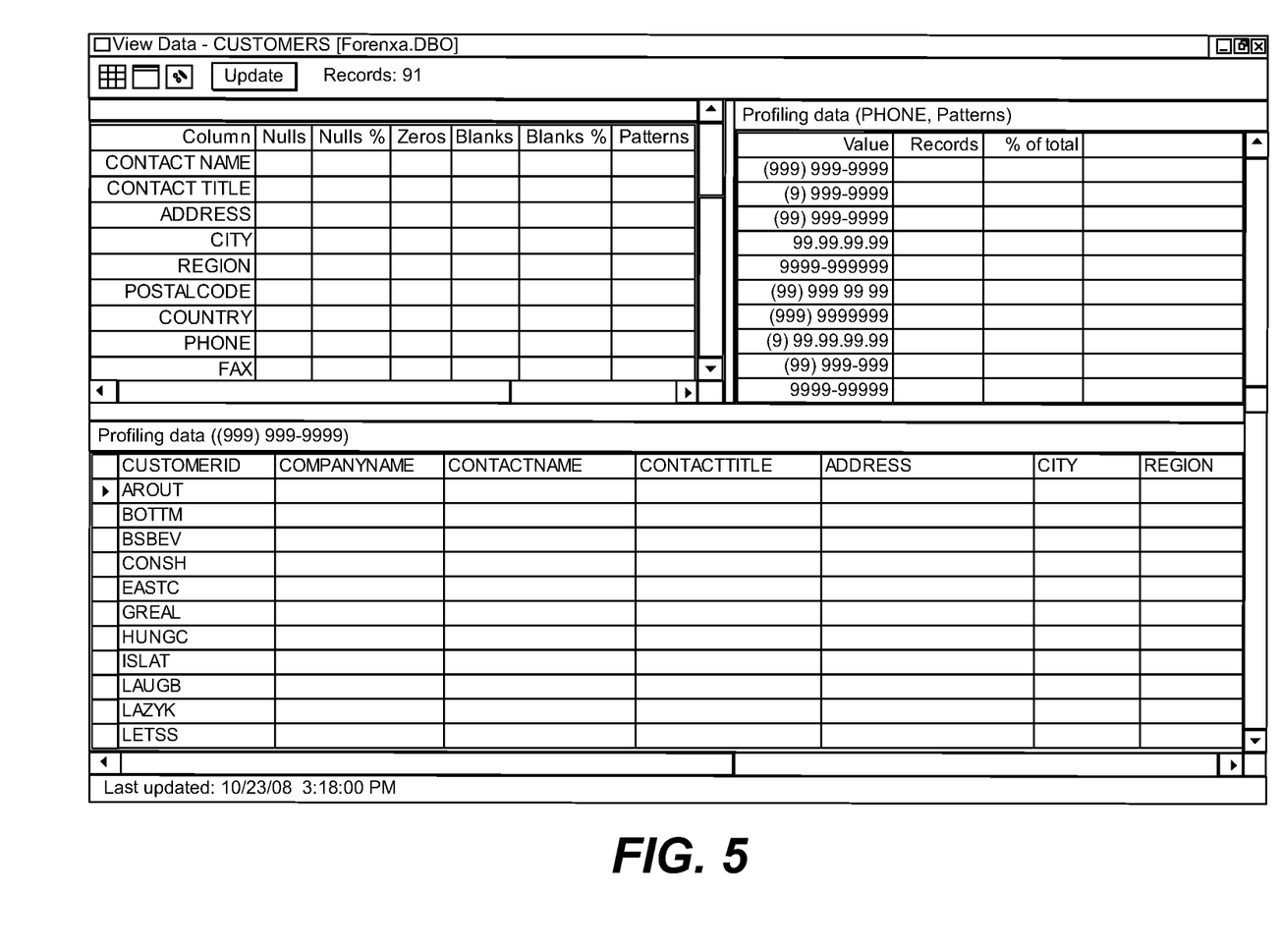
FIG. 5 illustrates an example of data organized into rows associated with certain subjects and columns each associated with a certain attribute of the subjects.

FIG. 5 illustrates an initial data set having a left-most column of CustomerIDs, as well as rows of attributes associated with these CustomerIDs. The attributes may include any of the following:
CustomerID
CompanyName
ContactName
ContactTitle
Address
City
Region
PostalCode
Country
Phone
Fax There might be a few rows or hundreds of thousands or millions of rows in this table. To profile this table, the following steps may be advantageously performed:

1. Vertically Partition the Data

A table reader may read the data out of this table and save the data for each column into separate files in binary format, including each of the following files, or at least files corresponding to any of the attributes in the original table that one wishes to profile:
CustomerID.bin
CompanyName.bin
ContactName.bin
ContactTitle.bin
Address.bin
City.bin
Region.bin
PostalCode.bin
Country.bin
Phone.bin
Fax.bin 2. Profile each Column on a Different Machine Each of the generated files is copied to a different machine for profiling concurrently depending on the availability of machines. For example, if there are only four machines, then the files may be distributed evenly on the four machines as follows:

CustomerID.bin, CompanyName.bin, ContactName.bin are copied to machine-1

ContactTitle.bin, Address.bin, City.bin are copied to machine-2

Region.bin, PostalCode.bin, Country.bin are copied to machine-3

Phone.bin, Fax.bin are copied to machine-4

Since each file only contains one column of the original data set in this example, the network communication overhead for copying data to a profiling machine is dramatically reduced. In another example, each file contains only a fraction of a single column, but the data from each column is separately stored within its own subset of multiple files. In another example, the contents of multiple columns, but less than all of the columns, are stored within a single file. For example, the dataset may include six columns. The first two columns may be stored in a first file, the third and fourth columns may be stored in the second file, and the fifth and sixth columns may be stored in a third file.

After files are copied, profiling jobs are started. The data is profiled on each file concurrently. Since each file now has only one column (fraction of a column or less than all of the columns), the overhead of processing extraneous columns in order to profile the columns corresponding to the relevant attributes is not expended.

A profiling job may involve calculating one or more attributes of a column and saving the associated sample row ID with an attribute, i.e., saving the rowID associated with rows which have attributes that meet profiling criteria. For example, there may be 20 patterns in a phone column which may be included with the dataset illustrated at FIG. 5, e.g., if one scrolled to the right, one might find a column labeled "phone". For each pattern, the system may save a sample row ID corresponding to a value that falls within the pattern. For example, for pattern (999) 999-9999, there may be 23 records each having a RowID associated with it (out of perhaps hundreds, thousands, tens of thousands or millions of records in a dataset). Each of the 23 records will also have other attribute values associated with them such as company name, contact name, contact title, address, city, region, etc., as illustrated at FIG. 5. The sample Row IDs for the 23 records are then output to a file. The rowIDs in the example of FIG. 5 are indicated as "CUSTOMERIDs".

3. Union/Merge the Row ID Files

In this step, the row IDs are unioned or merged.

Duplicates may be eliminated. The results are then sorted in the ascending order and output to another file, such as "SortedIDs.txt" as indicated in FIG. 4.

4. Merge-Sort-Join with Staging Files to Save Samples

Since SortedIDs.txt and the staging files are in the ID ascending order, a sort-merge-join may be performed to save samples for each attribute. The sample may be saved in a pivoted format. For example, Row 4 for pattern (999) 999-9999 indicated in FIG. 5 in a View Data snapshot may be saved as illustrated at FIG. 6. That is, the data associated with customerID AROUT is stored in eleven (11) different files in accordance with the vertical partitioning described above in accordance with certain embodiments. One of these files may be efficiently browsed, e.g., to find the sales representative closest to 155 Hanover Square, London. When customer ID AROUT, who is located at 120 Hanover Square, London, is determined to correspond to that closest sales rep, then the data corresponding to customerID AROUT is pulled from the eleven (11) different vertically-partitioned files to produce a dataset according to FIG. 6.

Figure 6:
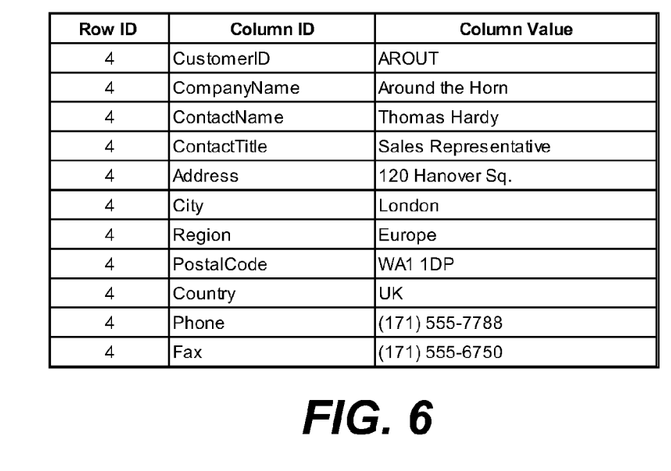
FIG. 6 illustrates an example of a sample identified in a profiling process after vertical partitioning of a full data set, and then merged, sorted and joined in accordance with certain embodiments.
Figure 7:
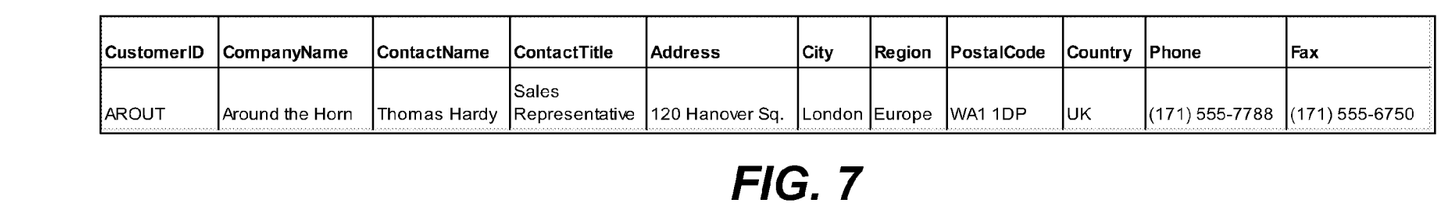
FIG. 7 illustrates the example of FIG. 6 which has been reverse-pivoted based on row identifier to show the selected sample in its original horizontal form in accordance with certain embodiments.

FIG. 7 then illustrates how the user interface may reverse pivot the data shown in FIG. 6 based on row ID to display the samples. That is, the values provided in the several rows of the right-most column of FIG. 6, which is labeled, "column value", are provided in a single row in FIG. 7. Those column values are headed in FIG. 7 with the values provided in the middle column of FIG. 6 which were pulled from the eleven (11) vertically-partitioned files.

Figure 8:
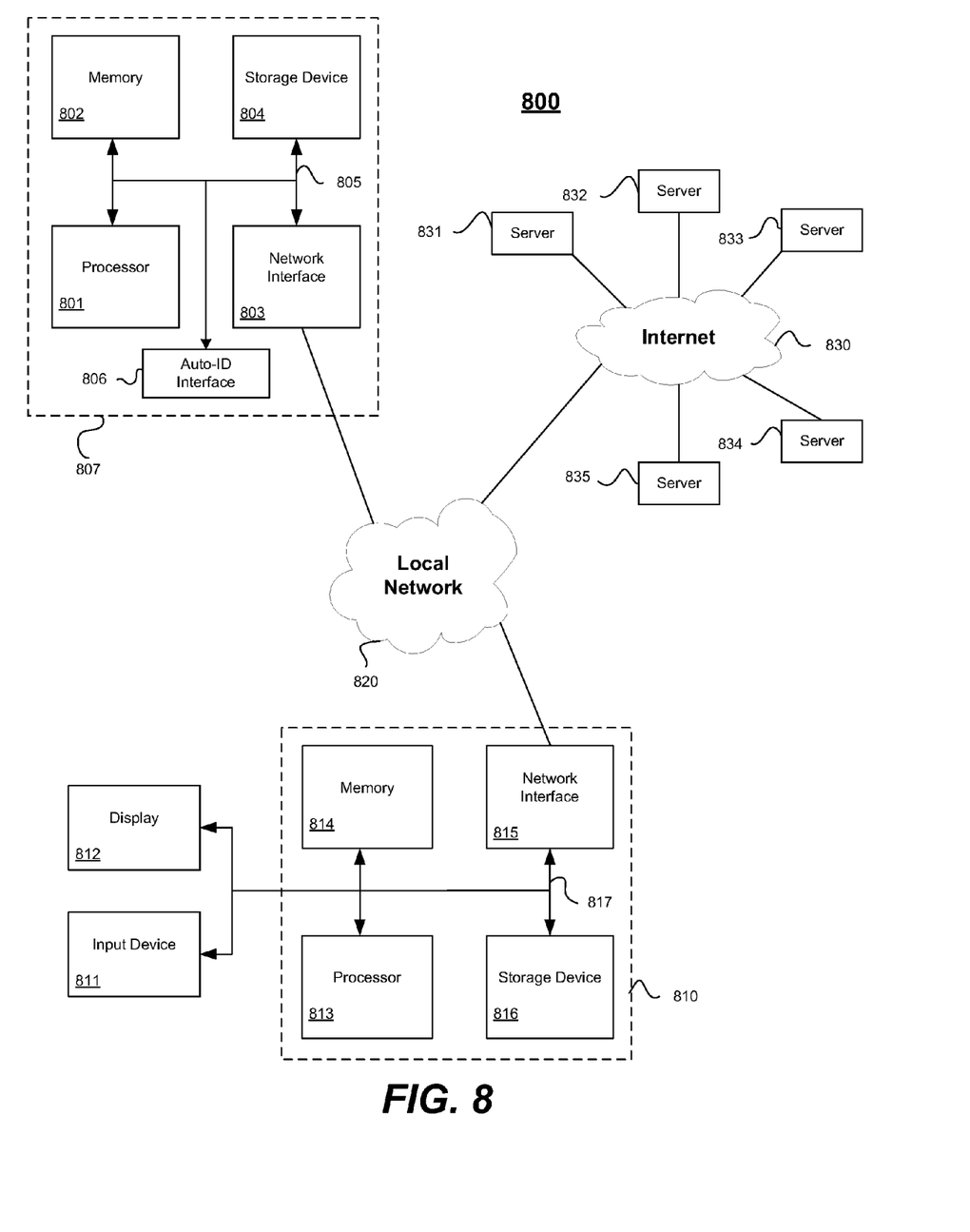
FIG. 8 illustrates an example computer system and networks including multiple components that, alone and/or in combination with other components, may be useful for implementing certain software processes.

FIG. 8 illustrates a simplified diagram of a hardware system for implementing processes according to one embodiment of the present invention. Computer system 810 includes one or more buses 817 or other communication mechanism for communicating information, and one or more central processing units ("CPUs" or "processors") 813 coupled with bus 817 for processing information. The central processing unit may be configured to perform the functions described above and is the means for performing the functions described above. Computer system 810 also includes one or more memories 814 coupled to bus 817 for storing information and instructions to be executed by processors 813, including information and instructions for performing the techniques described above, for example. This memory may also be used for storing variables or other intermediate information during execution of instructions to be executed by processors 813.

Possible implementations of this memory may be, but are not limited to, random access memory (RAM), read only memory (ROM), or both. A storage device 816 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 816 may include source code, binary code, or software files for performing the techniques or embodying the constructs above, for example.

Computer system 810 may be coupled via bus 817 to a display 812, such as a cathode ray tube (CRT) or liquid crystal display (LCD), for displaying information to a computer user. An input device 811 such as a keyboard and/or mouse is coupled to bus 817 for communicating information and command selections from the user to processor 813. The combination of these components allows the user to communicate with the system. In some systems, bus 817 may be divided into multiple specialized buses.

Computer system 810 also includes a network interface 815 coupled with bus 817. Network interface 815 may provide two-way data communication between computer system 810 and the local network 820. The network interface 815 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 815 sends and receives electrical, electromagnetic, or optical signals that carry digital data streams representing various types of information.

Computer system 810 can send and receive information, including messages or other interface actions, through the network interface 815 to an Intranet or the Internet 830. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 815 to a component on computer system 810. Different processes may be implemented on any computer system and send and/or receive information across a network, for example. In one embodiment, the techniques describe above may be implemented by software services on one or more servers 831-835, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

In addition, in methods that may be performed according to the claims below and/or embodiments described herein, the operations have been described in selected typographical sequences. However, the sequences have been selected and so ordered for typographical convenience and are not intended to imply any particular order for performing the operations, unless a particular ordering is expressly indicated or understood by those skilled in the art as being necessary.

What is claimed is:

1. A computer-implemented method of profiling a data set in a parallel processing environment, comprising:
    partitioning an initial data set stored in a row based format vertically according to multiple attribute subsets, wherein partitioning comprises extracting data for the multiple attribute subsets from the initial data set;
    storing the extracted data for the multiple attribute subsets in a plurality of staging files, the plurality of staging files including extracted data that is static;
    profiling the multiple attribute subsets based on a specific attribute value, wherein different staging files are provided to different machines in a plurality of machines for profiling;
    determining a set of row identifiers that satisfy the specific attribute value identified in the profiling of the different staging files processed on the plurality of machines;
    extracting, for each row identifier in the set of row identifiers, a row identifier, a column identifier, and a value of an attribute for a set of columns associated with each row identifier;
    merging the row identifier, the column identifier, and the value of the attribute for the set of columns associated with each row identifier to form a profiled subset of the initial data set; and
    transmitting, displaying or storing the profiled subset of the initial data set, a further processed version, or combinations thereof.

2. The method of claim 1, wherein the initial data set comprises a table having m rows and n columns.

3. The method of claim 2, wherein each column corresponds to a specific attribute and each row corresponds to a row identifier.

4. The method of claim 1, further comprising assigning a different machine in the plurality of machines to each of the attribute subsets.

5. The method of claim 4, wherein the profiling comprises concurrently profiling the attribute subsets assigned to the different machines.

6. The method of claim 1, wherein the merging comprises removing duplicate subject sets of row identifiers.

7. The method of claim 1, further comprising:
    storing the row identifier, the column identifier, and the value of the attribute for the set of columns associated with each row identifier in a file; and
    using the file to display at least one or more values of attributes stored in the file for a set of columns for a row identifier.

8. The method of claim 1, wherein the extracted data in the staging files is in a binary format.

9. A computer network including a parallel processing environment, comprising:
    a data source;
    multiple projection computers; and
    one or more client computers connected to the multiple projection computers and having computer-readable code embedded therein for programming the projection computers to perform a method of profiling a data set in the parallel processing environment, wherein the method comprises:
    partitioning an initial data set stored in a row based format vertically according to multiple attribute subsets, wherein partitioning comprises extracting data for the multiple attribute subsets from the initial data set;
    storing the extracted data for the multiple attribute subsets in a plurality of staging files, the plurality of staging files including extracted data that is static;

profiling the multiple attribute subsets based on a specific attribute value, wherein different staging files are provided to different projection computers in the multiple projection computers for profiling;

determining a set of row identifiers that satisfy the specific attribute value identified in the profiling of the different staging files processed on the multiple projection computers;

extracting, for each row identifier in the set of row identifiers, a row identifier, a column identifier, and a value of an attribute for a set of columns associated with each row identifier;

merging the row identifier, the column identifier, and the value of the attribute for the set of columns associated with each row identifier to form a profiled subset of the initial data set; and transmitting, displaying or storing the profiled subset of the initial data set, a further processed version, or combinations thereof.

10. The computer network of claim 9, wherein the initial data set comprises a table having m rows and n columns.

11. The computer network of claim 10, wherein each column corresponds to a specific attribute and each row corresponds to a row identifier.

12. The computer network of claim 9, wherein the method further comprises assigning a projection computer in the multiple projection computers to each of the multiple attribute data sets.

13. The computer network of claim 12, wherein the profiling comprises concurrently profiling the multiple data sets assigned to the different projection computer.

14. The computer network of claim 9, wherein the merging comprises removing duplicate subject sets of row identifiers.

15. The computer network of claim 9, wherein the merging comprises sorting the row identifiers.

16. One or more non-transitory processor-readable media having embedded therein processor-readable code to program one or more processors to perform a method of profiling a data set in a parallel processing environment, wherein the method comprises:

partitioning an initial data set stored in a row based format vertically according to multiple attribute subsets, wherein partitioning comprises extracting data for the multiple attribute subsets from the initial data set;

storing the extracted data for the multiple attribute subsets in a plurality of staging files, the plurality of staging files including extracted data that is static;

profiling the multiple attribute subsets based on a specific attribute value, wherein different staging files are provided to different machines in a plurality of machines for profiling;

determining a set of row identifiers that satisfy the specific attribute value identified in the profiling of the different staging files processed on the plurality of machines;

extracting, for each row identifier in the set of row identifiers, a row identifier, a column identifier, and a value of an attribute for a set of columns associated with each row identifier;

merging the row identifier, the column identifier, and the value of the attribute for the set of columns associated with each row identifier to form a profiled subset of the initial data set; and transmitting, displaying or storing the profiled subset of the initial data set, a further processed version, or combinations thereof.

17. The one or more processor-readable media of claim 16, wherein the initial data set comprises a table having m rows and n columns.

18. The one or more processor-readable media of claim 17, wherein each column corresponds to a specific attribute and each row corresponds to a row identifier.

19. The one or more processor-readable media of claim 16, wherein the method further comprises assigning a different machine in the plurality of machines to each of the attribute subsets.

20. The one or more processor-readable media of claim 19, wherein the profiling comprises concurrently profiling the attribute subsets assigned to the different machines.

21. The one or more processor-readable media of claim 16, wherein the merging comprises removing duplicate subject sets of row identifiers.

22. The one or more processor-readable media of claim 16, wherein the merging comprises sorting the row identifiers.

* * * * *